United States Patent [19]
White

[11] 3,891,644
[45] June 24, 1975

[54] 10,10-DISUBSTITUTED-2,3,4,10-TETRAHYDRO-AND 1,2,3,4,10 A-HEXAHYDROPYRIMIDOL[1,2-A]INDOLE DERIVATIVES

[75] Inventor: Alan Chapman White, Windsor, England

[73] Assignee: John Wyeth and Brother (Ltd.), Maidenhead, England

[22] Filed: May 18, 1973

[21] Appl. No.: 361,701

Related U.S. Application Data

[63] Continuation-in-part of Ser. No. 211,105, Dec. 22, 1971, abandoned.

[30] Foreign Application Priority Data

Jan. 11, 1971  United Kingdom................. 1250/71
Sept. 2, 1971  United Kingdom............... 40959/71

[52] U.S. Cl....................... 260/251 A; 260/256.4 Q
[51] Int. Cl.............................................. C07d 51/46
[58] Field of Search................... 260/251 A, 256.4 Q

[56] References Cited
OTHER PUBLICATIONS
White et al. – C.A. 77, 126681 f (1972).
Portnov et al. – C.A. 77, 48377 v (1972).

Primary Examiner—Donald G. Daus
Assistant Examiner—Raymond V. Rush

[57] ABSTRACT

A group of heterocyclic compounds useful as antidepressant agents is described. The compounds may also be used as anti-inflammatory agents, antihistamine agents, diuretics and hypoglycaemics. The compounds are 2,3,4,10-tetrahydro-pyrimido[1,2-a]indoles and 1,2,3,4,10,10a-hexahydropyrimido[1,2-a]indoles substituted in the 10-position by a hydroxy or lower acyloxy residue together with a phenyl, substituted phenyl, lower alkyl, lower alkynyl, benzyl, naphthyl, thienyl or pyridyl residue. The compounds are optionally substituted in the 2,3,4,6,7,8, or 9 positions and the Hexahydropyrimido[1,2-a] indoles may also be substituted in the 1-position. Exemplary of the compounds of the invention is 10-(m-chlorophenyl)-2,3,4,10-tetrahydropyrimido[1,2-a]indol-10-ol.

12 Claims, No Drawings

10,10-DISUBSTITUTED-2,3,4,10-TETRAHYDRO- AND 1,2,3,4,10-A-HEXAHYDROPYRIMIDOL[1,2-A]INDOLE DERIVATIVES

This application is a continuation-in-part of co-pending application Ser. No. 211,105 filed Dec. 22,1971 by Alan C. White now abandoned. The invention relates to a novel series of pyrimido[1,2-a]indole derivatives, to a process for their preparation and to pharmaceutical compositions containing them.

The compounds of the present invention are indole derivatives having the general formula (I)

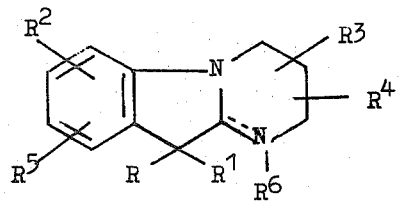

the acid addition salts thereof with pharmaceutically acceptable acids and the quaternary ammonium salts thereof, in which R represents a hydroxy or lower acyloxy group, $R^1$ represents a member of the group consisting of phenyl, lower alkyl, lower alkynl, benzyl, naphthyl, thienyl, pyridyl and phenyl substituted by at least one halogen, trifluoromethyl, lower alkly or lower alkoxy group, $R^2$ and $R^5$ (which may be the same or different) represent hydrogen, halogen or lower alkoxy, $R^3$ and $R^4$ (which may be the same or different) represent hydrogen or lower alkyl, the dotted line represents an optional bond in the position indicated, and $R^6$, which is present only when the optional bond represented by the dotted line is absent, represents hydrogen or lower alkyl.

The term "lower" as used herein means the radical contains up to 6, preferably up to 4 carbon atoms. It is to be understood that $R^3$ and $R^4$ may be on the same or different carbon atoms, but preferably they are both on the same carbon atom e.g., at position 3 in the tetrahydro- and hexahydro- pyrimido[1,2-a]indoles.

Since the compounds of the invention may possess one or more asymmetric carbon atoms, optical enantiomorphs are possible and the compounds of the invention may be the pure enantiomorphs or mixtures of such enantiomorphs, such as the racemates.

Examples of radicals R are hydroxyl, acetoxy, propionoxy and butyryloxy. Preferred examples of radicals $R^1$ are phenyl, naphthyl, furyl, thienyl, pyridyl and phenyl substituted by halogen (for example fluorine, chlorine or bromine), lower alkyl (for example methyl, ethyl, propyl, or butyl), lower alkoxy (for example methoxy, ethoxy, propoxy or butoxy) and trifluoromethyl. The radical $R^1$ may also be a lower alkyl radical, for example methyl, ethyl, propyl or butyl, or a lower alkynyl radical, which may be straight or branched chain, and which may for example be ethynyl or propargyl. The following are examples of $R^2$ and $R^5$: hydrogen, lower alkoxy (e.g., methoxy, ethoxy, propoxy and butoxy), and halogen (e.g., chlorine and bromine). Examples of $R^3$ and $R^4$ are hydrogen and lower alkyl groups such as methyl, ethyl, propyl and butyl.

The $R^6$ radicals may be hydrogen or straight or branched chain lower alkyl radicals, e.g., methyl, ethyl, propyl and butyl.

A preferred class of compounds of formula (I) are the tetrahydropyrimido[1,2-a]indoles of general formula (Ia)

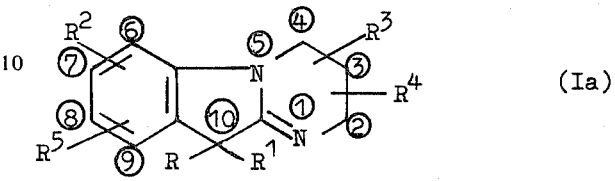

or acid addition salts thereof with pharmaceutically acceptable acids or the quaternary ammonium salts thereof, wherein R, $R^1$, $R^2$ and $R^5$ have the meanings given above in connection with formula (I). Compounds of particular value are those in which $R^2$, $R^3$, $R^4$ and $R^5$ represent hydrogen atoms, R represents hydroxyl and $R^1$ represents phenyl or phenyl substituted by at least one halogen, trifluoromethyl, lower alkyl or lower alkoxy group. The ring system of the pyrimido[1,2-a]indoles is numbered as shown in general formula Ia.

Especially valuable compounds of formula (Ia) are:
2,3,4,10-tetrahydro-10-phenylpyrimido[1,2-a]indol-10-ol, 10-(m-chlorophenyl)-2,3,4,10-tetrahydropyrimido[1,2-a]indol-10

10-(p-chlorophenyl)-2,3,4,10-tetrahydropyrimido[1,2-a]indol-10-ol, 2,3,4,10-tetrahydro- 10-(2-thienyl)pyrimido[1,2-a]indol-10-ol, 10-(m-fluorophenyl)-2,3,4,10-tetrahydropyrimido[1,2-a]indol-10-ol, 10-(3,4-dichlorophenyl)-2,3,5,10-tetrahydropyrimido[1,2-a]indol-10-ol, 10-(m-chlorophenyl)-2,3,4,10-tetrahydro-3,3dimethylpyrimido[1,2-a]indol-10-ol, 2,3,4,10-tetrahydro-10-phenyl-3,3-dimethylpyrimido[1,2-a]indol-10-ol, (+)-10-(m-chlorophenyl)-2,3,4,10-tetrahydropyrimido[1,2-a]indol-10-ol and (−)-10-(m-chlorophenyl)-2,3,4,10-tetrahydropyrimido[1,2-a]indol-10-ol.

Another class of compounds within formula (I) are the hexahydropyrimido[1,2-a]indoles, i.e., compounds of the general formula (Ib)

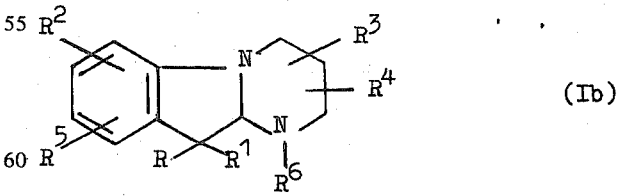

and the acid addition salts thereof with pharmaceutically acceptable acids and the quaternary ammonium salts thereof wherein R, $R^1$, $R^2$, $R^3$, $R^4$, $R^5$ and $R^6$ have the meanings given above in connection with formula (I).

The tetrahydropyrimido[1,2-a]indoles of general formula (Ia), can be prepared by a process which comprises reacting a ketone of general formula (II)

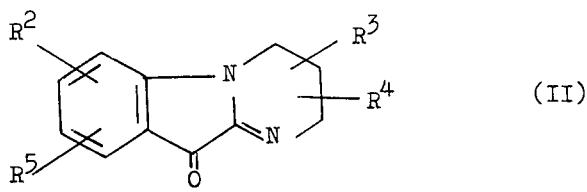

(where $R^2$, $R^3$, $R^4$ and $R^5$ have the meanings given above) with an organometallic compound known in the art for conversion of a ketone function to the group

and, if desired, lower acylating a resulting compound of formula (Ia) in which R represents a hydroxyl group to give a corresponding compound in which R represents a lower acyloxy residue and, if desired, converting a free base into an acid addition salt thereof with a pharmaceutically acceptable acid or into the quaternary ammonium salt thereof.

The starting ketones of general formula (II) may be prepared by hydrolysing a compound of general formula (V)

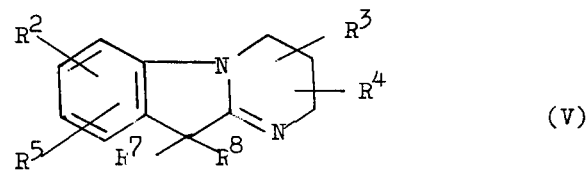

wherein $R^2$, $R^3$, $R^4$ and $R^5$ are as defined in connection with formula (I) and $R^7$ and $R^8$ are taken together and represent an alkylene ketal or two lower alkoxy groups. The compounds of general formula (V) may be prepared by hydrogenating an appropriate N-substituted isatin derivative, for example, that of general formula (III)

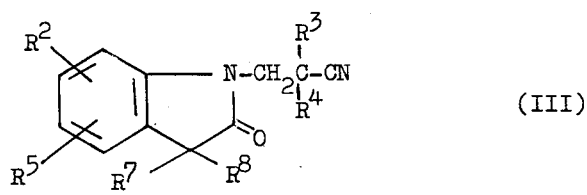

or dehydrating a corresponding amine, e.g., of the general formula (IV)

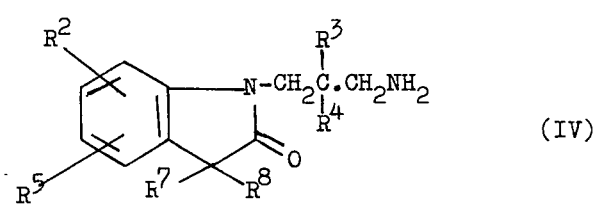

where $R^2$, $R^3$, $R^4$, $R^5$, $R^7$ and $R^8$ are as defined above.

The organometallic compound which is reacted with the ketone of general formula (II) is preferably chosen from (a) Grignard reagents of formula $R^1MgY$ wherein Y is a halogen and $R^1$ has the meanings defined above, and (B) alkali-metal compounds such as the lithium derivatives of formula $R^1Li$ (particularly the aryl lithiums, for example phenyl lithium), and sodium and potassium acetylide. The reaction of the ketone of general formula (II) with the organometallic compound is generally carried out in an inert organic solvent, for example ether or tetrahydrofuran, using the standard conditions known for the particular reaction concerned.

As already mentioned, if desired the compound in which R represents a hydroxy group and the dotted line represents a bond in the position indicated may be lower acylated to introduce a lower acyloxy residue R. Such an acylation reaction is carried out by standard methods known in the art. For example, the hydroxy compound may be treated with an acyl chloride or acid anhydride, optionally in the presence of pyridine or other base.

The compounds of general formula (I) in which the bond represented by the dotted line is absent (which have the general formula Ib) can be prepared by reducing, a compound of general formula (Ia)

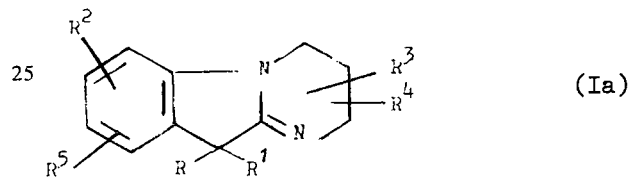

or a quaternary ammonium salt thereof in which the cation has the formula

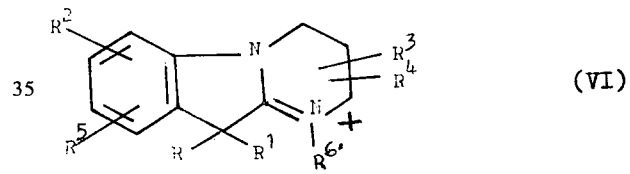

wherein R, $R^1$, $R^2$, $R^3$, $R^4$ and $R^5$ have the meanings given above and $R^6$ is a lower alkyl group, and if desired converting a free base into an acid addition or quaternary ammonium salt thereof.

For example, when it is desired to prepare a compound of general formula (Ib) in which $R^6$ represents hydrogen, a compound of general formula (Ia) may be reduced by methods known in the art. Preferably the reduction is effected by means of a hydride transfer reagent, particularly a complex metal hydride such as sodium borohydride or lithium aluminum hydride. The reaction is conducted using the standard conditions known for the particular reducing agent concerned.

When it is desired to prepare a compound of general formula (Ib) in which $R^6$ is lower alkyl, a quaternary compound in which the cation has the general formula (VI) is reduced as described above.

Once a compound of general formula (I) has been prepared in which R, $R^1$, $R^2$, $R^3$, $R^4$, $R^5$ and $R^6$ have the meanings defined in connection with formula (I), one group R and/or $R^2$ and/or $R^3$ and/or $R^4$ and/or $R^5$ and/or $R^6$ (if present) may, if desired, be converted into another group R and/or $R^1$ and/or $R^2$ and/or $R^3$ and/or $R^4$ and/or $R^5$ and/or $R^6$ each within the above defined meanings of R, $R^1$, $R^2$, $R^3$, $R^4$, $R^5$ and $R^6$. For example, when $R^2$ and/or $R^5$ is a hydrogen atom, this may be converted into a halogen group, particularly at the 8-position, by known methods, e.g., by treatment with N-chlorosuccinimide. When $R^1$ is an alkynyl radical, this may be reduced to a lower alkyl radical $R^1$. If desired a hydroxyl function R at the 10-position may be lower acylated to form a lower acyloxy residue R by the methods described hereinbefore.

When $R^6$ is a hydrogen atom, the compound may be alkylated by known methods to introduce a lower alkyl group $R^6$.

If necessary, any reactive group in a compound may be protected by known methods before performing any of the above reactions and the protecting group then removed by known methods subsequent to the reaction.

The hydrolysis of the compounds of general formula (V) may be carried out by methods known per se, for example, by heating with acid, e.g. dilute mineral acid such as hydrochloric acid. The yields of ketone (II), which may be isolated as its mineral acid salt by this method, is in the region of 50%. A preferred method for the hydrolysis consists in treating the compound with concentrated sulphuric acid at room temperature and isolating the compound as its free base (in yields of the order of 90%).

In a preferred method for preparing the compounds of formula (V), which can be hydrolysed to the starting ketones of formula (II), a substituted isatin of general formula (III) is hydrogenated. The hydrogenation is usually carried out in the presence of a nickel, palladium or platinum catalyst and at elevated temperatures and pressures. The use of temperatures in the region of 100°C usually gives rise to the tricyclic compound directly. In some instances and also when using somewhat lower temperatures, the product isolated consists of a mixture of the desired tricyclic compound and an intermediate amine of formula (IV)

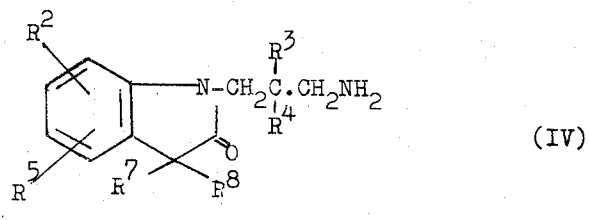

(IV)

The amine of formula (IV) may be dehydrated to obtain the desired tricyclic compound of formula (V) by subjecting the mixture to azeotropic distillation with a solvent such as benzene, xylene or toluene.

The N-substituted isatin derivatives such as those of formula (III) are known in the literature or may be prepared by methods known for preparing analogous compounds. For example, by reacting an isatin (bearing the substituents $R^2$ and $R^5$ in the aromatic ring) with a ketalising agent, to ketalise one of the oxo groups and with an alkylating agent, such as acrylonitrile or 3-bromopropionitrile to introduce the appropriate group on the N-atom.

The compounds of formula (I) are capable of forming acid addition salts with acids, particularly pharmaceutically acceptable acids, and the invention also provides such salts. The salts may be isolated directly from the processes described above or prepared by dissolving the specific compound of formula (I) as its base in a suitable organic solvent, and treating it with a solution of the selected acid, in accordance with conventional procedures for preparing acid addition salts from base compounds generally. As examples of acids, there may be used any of hydrochloric, hydrobromic, tartaric, phosphoric, maleic, citric, acetic or benzoic acid.

The compounds of general formula (I) are also capable of forming quaternary ammonium salts, and the invention also provides such salts. The quaternary salts may be prepared by treating the compound as its base in the presence or absence of a solvent, with an aryl-lower alkyl halide, lower alkyl halide, alkenyl halide, alkynyl halide or aminolower alkyl halide. Examples of such halides are methyl iodide and benzyl chloride and benzyl bromide.

The optical isomers of the compounds of formula (I) may be prepared by several processes. Preferably, a racemic mixture of a compound of the general formula (I) is resolved by standard methods described in the literature. The racemate may be prepared by any of the processes outlined above. It is to be understood that the resolution may be carried out on the racemic mixture of the final desired product, or it may be carried out on a racemate of one compound of general formula (I) and then the optical isomers subjected to after-processes (such as alkylation, acylation, hydrolysis, hydrogenolysis, and reduction) to give the desired product of formula (I).

Alternatively, an optically active isomer of a compound of the general formula (I) can be prepared by any of the methods outlined above employing an optically active starting material, or a resolution is carried out at any stage prior to formation of the compound of general formula (I). If necessary, the optically active isomer thus formed may be subjected to such reactions as alkylation, acylation, hydrolysis, hydrogenolysis, and reduction, to give the desired product.

A resolution is preferably carried out on a racemic mixture of a basic compound of general formula (I) by methods described in the literature, such as by use of an optically active acid. For instance, a solution of the racemate in a suitable solvent such as an alcohol is treated with a solution of an optically active acid to cause crystallisation of the salt of one particular enantiomorph. The other enantiomorph can often be obtained from the mother liquors, or if necessary by treatment with a base and then with the other optical isomer of the optically active acid, or alternatively a fresh solution of the racemate can be treated with a solution of the other enantiomorph of the optically active acid. The actual solvent and optically active acid to be used in any one instance cannot be predicted, and the choice is determined experimentally. The best combination is that which allows the salt to be most easily isolated in a high state of purity (i.e., freedom from the other enantiomer) and in a crystalline form.

It has been found that D(−) and L(+)-tertaric acid are particularly suitable for the resolution of some compounds of formula (I).

The compounds of the invention exhibit pharmacological activity as anti-depressants. In one method of evaluating their anti-depressant properties the effect of the compounds on hypothermia in mice induced by reserpine is measured by the procedure of B. M. Askew, Lift Sciences (1963), 1, 725–730. The compounds are orally administered in a dosage range of about 2 to about 50 mg/kg. to mice previously dosed subcutaneously with 2 mg/kg of reserpine and the rise in rectal temperature of the mice compared to that in a control group of animals. The following table illustrates the results obtained with compounds which are particularly effective in this test.

| Compound of Example | Dose (mg/kg p.o.) | Rise in rectal temperature (°C). |
|---|---|---|
| 4 | 8 | 5.3 |
|  | 16 | 7.3 |
|  | 32 | 9.6 |
| 12 | 2 | 5.3 |
|  | 4 | 6.3 |
|  | 8 | 7.5 |
|  | 16 | 11.7 |
|  | 32 | 12.7 |
| 16 | 20 | 7.5 |
|  | 40 | 9.3 |
| 17 | 20 | 6.3 |
|  | 40 | 6.4 |
| 19 | 10 | 5.1 |
|  | 20 | 6.0 |
|  | 40 | 8.4 |
| 20 | 10 | 7.6 |
|  | 20 | 7.5 |
|  | 40 | 9.0 |
| 21 | 10 | 7.4 |
|  | 15 | 10.5 |
|  | 20 | 9.0 |
| 24 | 20 | 6.0 |
| 25 | 5 | 5.5 |
|  | 10 | 6.9 |
|  | 20 | 9.8 |
| 26 | 5 | 4.6 |
|  | 10 | 7.0 |
|  | 20 | 9.8 |
| 28 | 5 | 5.2 |
|  | 10 | 8.5 |
|  | 20 | 9.5 |
| 30 | 5 | 4.9 |
|  | 10 | 7.2 |
|  | 20 | 10.9 |
| 31 | 10 | 4.9 |
|  | 20 | 9.4 |
| 40 | 5 | 4.9 |
|  | 10 | 5.9 |
|  | 20 | 9.6 |
| 41 | 4 | 7.6 |
|  | 8 | 8.8 |
|  | 16 | 9.3 |
|  | 32 | 10.7 |
| 43 | 20 | 6.3 |
| 45 | 20 | 4.9 |

10-(m-Chlorophenyl)-2,3,4,10-tetrahydropyrimido[1,2-a]indol-10-ol is of particular interest since it shows many of the anti-depressant properties of conventional tricyclic anti-depressants but reduced anticholinergic side effects on pharmacological testing.

The compounds have also been assessed for anti inflammatory activity by their ability to inhibit experimentally-induced edema in the hind paw of rats according to the procedure of Winter et al., Proc. Soc. Exp. Biol. and Med., (1962), 111, 544 and Buttle et al., Nature (1957), 179,629. The compounds were administered orally in a dose range of about 1 to about 100 mg/kg and the percentage inhibition of the swelling of the paw as compared to control animals was measured. The following table illustrates the results obtained with compounds which are particularly active in this test.

| Compound of Example | Dose (mg/kg p.o.) | % Inhibition |
|---|---|---|
| 4 | 10 | 44 |
|  | 30 | 55 |
| 7 | 50 | 61 |
| 8 | 10 | 29 |
|  | 30 | 82 |
| 11 | 30 | 26 |
| 12 | 30 | 50 |
|  | 100 | 51 |

-Continued

| Compound of Example | Dose (mg/kg p.o.) | % Inhibition |
|---|---|---|
| 16 | 50 | 50 |
| 17 | 50 | 63 |
| 19 | 1 | 37 |
|  | 10 | 37 |
|  | 30 | 64 |
| 20 | 30 | 32 |
| 21 | 1 | 46 |
|  | 50 | 50 |
|  | 100 | 83 |
| 22 | 1 | 35 |
|  | 10 | 35 |
|  | 100 | 93 |
| 23 | 100 | 61 |
| 24 | 10 | 32 |
| 30 | 10 | 38 |
| 45 | 10 | 25 |

The compounds of the invention also possess some antihistaminic, diuretic and hypoglycemic activity when tested by standard pharmaceutical procedures.

In addition, 10-(p-chlorophenyl)-2,3,4,10-tetrahydropyrimido[1,2-a]indol-10-ol has anti-gastric ulcer activity as determined by a procedure similar to that of Brodie and Hanson, J. Appl. Physiol., 1960, 15, 291-294. In this test the compound was found to produce over 60% inhibition of ulceration in rats when administered orally at a dose of 10 or 30 mg./kg. The compound also demonstrated an inhibitory effect against the secretion of gastric juice when tested by the procedure of Shay et al., Gastroenterology, 1954, 26, 906 to 913. It showed significant decrease in the volume of gastric contents, the concentration of acid and the amount of free and total acid when administered at a dose of 30 mg./kg. into the rat duodenum.

Depression in mammals may be treated by administering a pharmaceutically effective amount of the indole derivatives of general formula (I) or an acid addition or quaternary ammonium salt thereof.

As the compounds of general formula (I) show pharmaceutical activity, the invention further provides a pharmaceutical composition which comprises a compound provided by the invention which may be micronised, in association with a pharmaceutically acceptable carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agent, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, interaperitoneal or subcutaneous injection. In many instances a compound is orally active and can be administered orally either in liquid or solid compositions.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less of 500 or more, according to the particular need and the activity of the active ingredient. The invention also includes the compounds in the absence or carrier where the compounds are in unit dosage form.

The following Examples illustrate the invention and the preparation of starting materials for preparing the compounds of the invention.

EXAMPLE 1

3′,4′-Dihydrospiro[1,3-dioxolane-2,10′-(2H,10H)pyrimido (1,2-a)indole

2′-Oxospiro [1,3-dioxolane-2,2′-indoline]-1′-propionitrile (37 g; Netherlands Patent Application No. 6,507,422; Chem. Abs. 1966, 65, 2228, was reduced at an initial pressure of 1200 p.s.i. and final temperature of 100°C in ethanol (200 ml.) half saturated with ammonia, in the presence of Raney Nickel (6 g.) or 3 hours. After cooling, the catalyst was filtered off and the solvent removed under reduced pressure to leave a viscous oil. The oil was dissolved in xylene (200 ml.) and heated under reflux with stirring for 26 hours in an apparatus fitted with a water separator. The xylene was removed under reduced pressure, the dark oil dissolved in hot ethyl acetate and treated with decolourising charcoal. The product, 25.9 g. of colourless needles, had m.p. 114°–115°C. [Found: C, 68.0; H,5.9; N,12.2. $C_{13}H_{14}N_2O_2$ requires C, 67.8; H, 6.1 N, 12.2%).

EXAMPLE 2

3,4-Dihydropyrimido[1,2-a]indol-10[2H]-one

3′, 4′-Dihydrospiro [1,3-dioxolane-2,10′(2H,10H) pyrimido (1,2-a)indole] (12.2 g.) was suspended in water (50 ml.) and concentrated hydrochloric acid (50 ml.) added with stirring. The mixture was heated at 85°C for 5 hours. The mixture was evaporated to a red oil under reduced pressure, dissolved in absolute ethanol (100 ml.) and evaporated to 50 ml. On cooling, the product separated as crimson needles (1.9 g.), m.p. 215°–225°C (decomp). (Found: C,59.0; H,5.0; N,12.3, $C_{11}H_{10}N_2O$. HCl requires C,59.3; H,5.0; N,12.6%).

EXAMPLE 3

3,4-Dihydropyrimido[1,2-a]indol-10[2H]-one

Finely powdered 3′, 4′-dihydrospiro [1,3-dioxolane-2,10′(2H,10H)pyrimido (1,2-a)indole](10g.) was added portionwise to stirring concentrated sulphuric acid 50 ml.) which was maintained at 25°C by icebath cooling. On completion of the addition the mixture was stirred at room temperature overnight, poured onto ice and neutralised with concentrated aqueous ammonia solution, keeping the temperature below 30°C. The mixture was extracted with chloroform and dried over anhydrous magnesium sulphate. After evaporation, the product was crystallised from benzene/light petroleum (b.p. 60°–80°C.) affording 7.3 g. of stout crimson needles, m.p. 121°–122°C. (Found: C, 71.0; H, 5.4; N, 14.7. $C_{11}H_{10}N_2O$ requires C, 70.95; H, 5.4; N, 15.05%).

EXAMPLE 4

2,3,4,10-Tetrahydro-10-phenylpyrimido[1,2-a]indol-10-ol

Finely powdered 3,4-dihydropyrimido [1,2-a]indol-10[2H]-one hydrochloride (3.82 g.) was added portionwise the phenyl magnesium bromide [from magnesium (12.9 g.) and bromobenzene (8.2 g)] in ether (100 ml.). On completion, the reaction mixture was heated under reflux overnight, cooled and poured onto a mixture of ice and ammonium chloride (10 g.). The yellow solid which was deposited was filtered off and washed with water and ether affording 3.67 g. of off white powder, m.p. 246°–7°C. (decomp).

The base could be recrystallised from ethanol as colourless rhombs, m.p. 247°–8°C. (Found: C, 77.6; H, 6.2; N, 10.5. $C_{17}H_{16}N_2O$ requires C, 77.3; H, 6.1; N, 10.6%).

The hydrochloride of the base could be obtained by dissolving in hot absolute ethanol and adding a solution of hydrogen chloride gas in dry ether. The product, colourless needles, had m.p. 264°–70°C (decomp). (Found: C, 68.2; H, 5.7; N, 9.2. $C_{17}H_{16}N_2O$. HCl requires C, 67.85; H, 5.7; N, 9.3%).

EXAMPLE 5

2,3,4,10-Tetrahydro-10-phenylpyrimido[1,2-a]indol-10-ol.

Phenyl lithium (0.05 mole.) in ether was added dropwise to a stirred suspension of the pyrimido [1,2-a]indol-10[2H]-one hydrochloride of Example 2 (2.2g.) in dry ether (IL) under a stream of nitrogen. The colourless solution formed was left at room temperature overnight and decomposed by the addition of water (35 ml.) and 2N hydrochloric acid (15 ml.). The solid formed was filtered off, washed with water and dried affording the title compound (1.57 g.) m.p. 220°–225°C. Recrystallisation from ethanol raised the m.p. to 246°–7°C.

EXAMPLE 6.

2,3,4,10-Tetrahydro-10-phenylpyrimido[1,2-a]indol-10-ol.

3,4-Dihydropyrimido]1,2-a]indol-10-one (5.58 g.) in dry tetrahydrofuran was added dropwise with stirring to phenyl magnesium bromide (0.05 mole.) in dry ether (200 ml.). The reaction mixture was heated under reflux with stirring for 3 hours. The reaction mixture was decomposed by pouring onto a mixture of ice and ammonium chloride affording 6.38 g. pink powder, m.p. 230°–5°C (decomp.). Recrystallisation from ethanol raised the m.p. to 246°–8°C (decomp).

EXAMPLE 7

10-(p-Chlorophenyl)-2,3,4,10-tetrahydro-pyrimido [1,2-a]indol-10-ol

Finely powdered 3,4-dihydropyrimido[1,2-a]-indol-10[2H]-one hydrochloride (6.5 g. 0.03 mole.) was reacted with p-chlorophenyl magnesium bromide (0.2 mole.) in dry ether (700 ml.) as described in Example 4. Work up with ice and ammonium chloride afforded the base m.p. 185°–191°C (demomp). (Found: C, 68.4; H, 5.3; N, 9.4. $C_{17}H_{15}N_2Cl0$ requires C, 68.1; H, 5.1; N, 9.4%).

A total of 2.6 g. of the hydrochloride was obtained by dissolving in ethanol and treating with a solution of hydrogen chloride in dry ether, m.p. 275°–279°C (decomp). (Found: C, 60.2; H, 5.3; N, 7.6; Cl, 9.9. $C_{17}H_{15}N_2Cl0 \cdot HCl \cdot \frac{1}{2} C_2H_5OH$ requires C, 60.4; H, 5.35; N, 7.8; Cl, 10.1%).

EXAMPLE 8

2,3,4,10-Tetrahydro-10-(o-tolyl)pyrimido[1,2-a]indol-10-ol 3,4-Dihydropyrimido[1,2-a]indol-10[2H ]-one hydrochloride (6.66 g.; 0.03 mole.) was reacted with o-tolyl magnesiumbromide (0.1 mole.) in ether (1L) as described in Example 4. Work up afforded the base (4.1 g.), m.p. 205°–207°C (decomp.). (Found: C, 77.5; H, 6.7; N, 9.9. $C_{18}H_{18}N_2O$ requires C, 77.7; H, 6.5; N, 10.1%).

Treatment of the base in isopropanol with dry hydrogen chloride in ether afforded the hydrochloride as colourless fine needles (4.4 g.), m.p. 300°–302°C (decomp). (Found: C, 68.7; H, 6.25; N, 8.8. $C_{18}H_{18}N_2O \cdot HCl$. requires C, 68.7; H, 6.1; N,8.9%).

EXAMPLE 9

2,3,4,10-Tetrahydro-10-(p-toly)pyrimido[1,2-a]indol-10-ol

Following the method of Example 4, 6.6 g. of 3,4-dihydropyrimido [1,2-a]indole-10[2H]-one hydrochloride and p-tolyl magnesium bromide (0.15 ml.) in dry ether (1500 ml.) afforded the title compound hydrochloride (1.28 g.) as colourless needles, m.p. 265°–267°C (decomp). (Found: C. 68.9; H, 6.3; N, 8.9. $C_{18}H_{18}N_2O \cdot HCl$ requires C, 68.7; H, 6.1; N, 8.9%).

EXAMPLE 10

2,3,4,10-Tetrahydro-10-methylpyrimido[1,2-a]indol-10-ol

Following the method of Example 6, 3,4-dihydropyrimido[1,2-a]indol-10[2H]-one (3.72 g.) was reacted with methylmagnesium iodide (0.06 mole.) in ether (500 ml.). After refluxing for 4 hours and leaving overnight the reaction mixture was poured onto ice and ammonium chloride, the ether layer separated and aqueous layer extracted with chloroform. The chloroform extracts were dried over anhydrous magnesium sulphate and evaporated to a solid which was recrystallised from isopropanol affording 2.1 g. of fawn rhombs, m.p. 189°–191° C. (Found: C,71.6; H,7.1; N,13.9. $C_{12}H_{14}H_2O$ requires C,71.3; H, 7.0; N,13.85%). When this solid was dissolved in isopropanol and treated with anhydrous hydrogen chloride in ether, 2.0 g. of the hydrochloride were obtained, m.p. 210°–212°C (decomp.). (Found: C,60.8; H,6.3; N,11.7. $C_{12}H_{14}N_2O \cdot HCl$ requires C,60.4; H,6.3; N,11,7%).

EXAMPLE 11

10-Benzyl-2,3,4,10-tetrahydropyrimido[1,2-]indol-10-ol

Following the method of Example 6, the 3,4-dihydropyrimido[1,2a]indole-10[2H]-one (3.72 g.) was added dropwise to a stirred solution of benzylmagnesium chloride (0.04 mole.) in dry ether (300 ml.). The reaction was heated under reflux for 4 hours and left overnight and decomposed by pouring onto ice and ammonium chloride yielding the required base (4.3 g.), m.p. 225°–30°C (decomp.). Treatment of an isopropanol solution with hydrogen chloride in dry ether afforded the hydrochloride as colourless fine needles, m.p. 241°–243°C (decomp.). (Found: C,68.9; H,6.2; N,9.1. $C_{18}H_{18}N_2O \cdot HCl$ requires C,68.7; H,6.1; N,8.9%).

EXAMPLE 12

10-(m-Chlorophenyl)-2,3,4,10-tetrahydropyrimido[1,2-a]indol-10-ol

Following the method of Example 6, the 3,4-dihydropyrimido-[1,2-a]indole-10[2H]-one (3.72 g.) was reacted with m-chlorophenylmagnesiumbromide (0.04 mole.) in dry ether (500 ml.). The reaction mixture was heated under reflux 6 hours then left overnight. The mixture was poured onto ice and ammonium chloride and the product was filtered off yielding 4.1 g. of a white powder, m.p. 193°–5°C (decomp.). After converting to the hydrochloride, 4.79 g. of fine needles, m.p. 275°–80°C. (decomp.) were obtained. (Found: C,61.0; H,4.9; N,8.3. $C_{17}H_{14}N_2O \cdot HCl$ requires C,60.9; H,4.7; N,8.4%).

EXAMPLE 13

8'-Chloro-3',4'-dihydrospiro [1,3-dioxolane-2,10'(2H,10H) pyrimido (1,2-a)indole]

3', 4'-Dihydrospiro[1,3-dioxolane-2,10'(2H,10H) pyrimido (1,2-a) indole] (2.3 g.) was heated under reflux with stirring in carbon tetrachloride (50 ml.) with N-chlorosuccinimide (1.43 g.) for 16 hours. After cooling, the carbon tetrachloride was washed with 2N-sodium bicarbonate solution. The organic layer was then washed with 2N hydrochloric acid. The acid extracts were basified with concentrated aqueous ammonia solution and the white solid extracted into ether. After drying with anhydrous magnesium sulphate, the solvent was removed to leave an oil which was crystallised from light petroleum (b.p. 100°–120°C) containing a few drops of benzene. The product (0.73 g.) as colourless needles had m.p. 112°–114°C. (Found: C,58.95; H,5.0; N,10.3. $C_{13}H_{13}ClN_2O_2$ requires C,59.0; H,4.95; N,10.6%).

EXAMPLE 14

3′,4′-Dihydrospiro[1,3-dioxolane-3′3′-dimethyl-2,10′(2H,10H) pyrimido(1,2-a)indole]

a. Isatin (7.35 g.), ethyleneglycol (11.2ml.) and toluene-p-sulphonic acid (2 g.) in benzene (300 ml.) was heated under reflux in an apparatus fitted with a water separator for 5 hours, when water (2.1 ml.) was collected in the water separator and the reaction mixture had become colourless. The reaction mixture was cooled, washed with sodium bicarbonate solution and water. After drying over magnesium sulphate the benzene was removed under reduced pressure and the residue crystallised from methanol affording 9.9 g. of 2′-oxospiro[1,3-dioxolane 2,3′-indoline] as faintly pink needles, m.p. 131°–132°C. (Found: C,62.72; H,4.8; N,7.2. $C_{10}H_9N_3O_3$ requires C,62.8; H,4.8; N,7.2%).

b. t-Butylcyanide (42.0 g.) was heated at 60°C with stirring in a mixture of bromine (26 ml.) and carbon tetrachloride (1L) for 7 days, irradiating at the same time with a medium pressure ultra-violet lamp. The carbon tetrachloride was removed under reduced pressure and the residual oil dissolved in dichloromethane and washed with sodium bicarbonate then water. After drying over anhydrous magnesium sulphate the solvent was removed and the product distilled affording 26 g. of 3-bromo-2,2-dimethylpropionitrile as a colourless oil, b.p. 77°–82°C at 12 mm. (Found: C,36.1; H,4.8; N,7.4. $C_5H_8BrN$ requires C,37.1; H,5.0; N,8.65%).

c. 2′-Oxospiro [1,3-dioxolane-2,3′-indoline], (3.8 g.) was added portionwise to a stirred suspension of sodium amide (0.84 g.) in dry hexamethylphosphoric triamide (30 ml.) under a stream of nitrogen. The reaction mixture was heated to 40°C for 2 hours, cooled to 10°C and 3-bromo-2,2-dimethylpropionitrile (3.24 g.) added in one portion. The reaction mixture was stirred at room temperature for 2 days. The reaction mixture was poured into water and extracted with benzene. The benzene extracts were washed with dilute hydrochloride acid, dried over anhydrous magnesium sulphate and evaporated to a dark oil. Crystallisation from absolute ethanol afforded 3.05 g. of 2′-oxospiro[1,3-dioxolane-2,3′-indoline]-1′-[2,2-dimethylpropionitrile] as colourless rhombs, m.p. 112°–113°C. (Found: C,66.5; H,6.2; N,10.3. $C_{15}H_{16}N_2O_3$ requires C,66.2; H,5.9; N,10.3%).

d. The product of Example 14(c) (2.7 g.) was reduced in ethanolic ammonia in the presence of Raney Nickel as described for Example 1. After work up, the product was heated under reflux with toluene for 24 hours. Removal of the toluene and recrystallisation from benzene afforded 1.23 g. of the title compound as colourless rhombs, m.p. 109°–110°C. (Found: C,70.0; H,7.2; N,11.1. $C_{15}H_{18}N_2O$ requires C,69.7; H,7.0; N,10.85%).

EXAMPLE 15

8-Chloro-2,3,4,10-tetrahydropyrimido[1,2-a]indol-10[2H]-one

8′-Chloro-3′,4′-dihydro-spiro[1,3-dioxolane-2,10′(2H,10H) pyrimido(1,2-a)indole] (8.0 g.) was finely powered and added to concentrated sulphuric acid (50 ml.) as described in Example 3. Following the method of that example, work up and recrystallisation from benzene afforded red plates (5.8 g.), m.p. 163°–165°C (decomp). Found: C,60.2; H,3.9; N,12.8. $C_{11}H_9ClN_2O$ requires C,59.9; H,4.1; N,12.7%.

EXAMPLE 16

8-Chloro-2,3,4,10-tetrahydro-10-phenylpyrimido[1,2-a]indol-10-ol

Following the method of Example 6,8-Chloro-2,3,4,10-tetrahydropyrimido[1,2-a] indol-10-one in tetrahydrofuran (60 ml.) was added to a solution of phenylmagnesium bromide (0.026 mole.) in ether (50 ml.). Mixture was heated under reflux with stirring for 5 hours and after leaving overnight poured onto a mixture of ice and ammonium chloride. The solid formed was filtered off, and washed with water and ether to give 2.74 g. of a fawn powder, m.p. 240°–250°C (decomp.). (Found: C,67.6; H,5.3; N,8.9.$C_{17}H_{15}ClN_2O$ requires C,68.9; H,5.6; N,9.4%).

The powder was suspended in hot absolute ethanol and treated with a solution of dry hydrogen chloride gas in dry ether to give 1.89 g. of fine needles, m.p. 279°–282°C (decomp.). (Found: C,61.25; H,4.8; N,8.5. $C_{17}H_{15}ClN_2O.HCl$ requires C,60.9; H,4.8; N,8.1%).

EXAMPLE 17

8-Chloro-10-(m-chlorophenyl)-2,3,4,10-tetrahydro pyrimido[1,2-a]indol-10-ol

Following the method of Example 6, 8-chloro-2,3,4 10-tetrahydropyrimido[1,2-a]indol-10-one (2.8 g.) in dry tetrahydrofuran (60 ml.) was added to m-chlorophenylmagnesium bromide (0.03 mole.) in ether (60 ml.). Reaction mixture heated under reflux for 4 hours. After leaving overnight, the reaction mixture was poured onto ice and ammonium chloride. Organic layer separated and aqueous layer extracted with methylene dichloride. Organic layer extracted with 2N-hydrochloric acid, acid layer basified, extracted into methylene dichloride; after drying over magnesium sulphate, solvent removed and residue dissolved in absolute ethanol and treated with a solution of hydrogen chloride in dry ether. Pale pink rhombs (1.61 g.), m.p. 279°C (decomp.) were obtained. (Found: C,54.8; H,4.15; N,7.3. $C_{17}H_{14}Cl_2N_2O$. HCl requires C,55.2; H,4.1; N,7.6%).

EXAMPLE 18

10-(m-Anisyl)-2,3,4,10-tetrahydropyrimido[1,2-a]indol-10-ol

Following the method of Example 6, 2,3,4,10-tetrahydropyrimido[1,2-a]indol-10-one (3.72 g.) in dry tetrahydrofuran (50 ml.) was added to m-anisylmagnesiumbromide (0.04 mole.) in ether (50 ml.). Heated under re+ux with stirring for 5 hours, left overnight then poured onto ice and ammonium chloride. After acid-base extraction, 2.16 g. base obtained, m.p. 255°C (decomp). The solid was converted to its hydrochloride by solution in ethanol and addition of hydrogen chloride in dry ether to give 2.2 g. colourless rhombs, m.p. 260°–262°C (decomp). (Found: C,65.5; H,6.0; N,8.5. $C_{18}H_{18}N_2O_2$. HCl requires C,65.3; H,5.8; N,8.5%).

EXAMPLE 19

2,3,4,10-Tetrahydro-10-(m-tolyl)pyrimido[1,2-a]indol-10-ol

Following the method of Example 6, 2,3,4,10-tetrahydropyrimido[1,2-a]indol-10-one in tetrahydrofuran (50 ml.) was added to m-tolylmagnesium bromide (0.05 mole.) in ether (200 ml.). On completion of the addition the mixture was heated under reflux for 3 hours. After leaving overnight, the reaction mixture was poured onto a mixture of ice and ammonium chloride. The organic layer was separated and the aqueous layer extracted with chloroform. After drying, the chloroform was removed to leave a red oil. Trituration with ether afforded a white solid. The solid was recrystallised from benzene-ether to give pale yellow rhombs (1.36 g.), m.p. 179°–80°C. (Found: C,77.4; H,6.7; N,9.8. $C_{18}H_{18}N_2O$ requires C,77.7; H,6.5; N,10.1%).

EXAMPLE 20

2,3,4,10-Tetrahydro-10-(2-thienyl) pyrimido[1,2-a]indole-10-ol 2,3,4,10-Tehydropyrimido[1,2-a]indol-10-one (3.72 g.) in dry tetrahydrofuran (150 ml.) was added to 2-thienyl magnesium bromide (0.05 mole.) as described in Example 19. On the completion of the addition the reaction was stirred under reflux for 4 hours. The reaction mixture was poured onto ice and ammonium chloride and filtered to afford 4.38 g. of a grey powder. The powder was suspended in absolute ethanol, and treated with a solution of hydrogen chloride in dry ether, the mixture was boiled and then treated with charcoal and filtered. On dilution with ether the title compound was obtained as colourless needles (3.68 g.), m.p. 226°–228°C (decomp.). (Found: C,58.6; H,5.0; N,9.9. $C_{15}H_{14}N_2OS$. HCl requires C,58.7; H,4.9; N,9.1%).

EXAMPLE 21

10-(m-Fluorophenyl)-2,3,4,10-tetrahydropyrimido[1,2-a]indol-10-ol 3,4-Dihydropyrimido[1,2-a]indol-10[2H]-one (3.72g) in dry tetrahydrofuran (100 ml.) was added dropwise to a stirred solution of m-fluorophenyl magnesium bromide (0.05 mole) in dry ether. The reaction mixture was stirred under reflux for 4 hours, cooled and decomposed by pouring onto a mixture of ice and ammonium chloride. The organic layer was separated and the aqueous layer extracted with chloroform. Combined organic extracts were washed with water and dried over anhydrous magnesium sulphate. After removal of the solvent, the residue was triturated with ether affording 3.3g. of fawn solid. The solid was suspended in boiling absolute ethanol, a solution of hydrogen chloride gas in dry ether added and the resulting solution treated with charcoal and filtered. On cooling the filtrate the title compound as its hydrochloride crystallised as needles (3.3g.), m.p. 280°–90°C (decomp.) (Found: c,64.0; H,5.1; N,8.9. $C_{17}H_{15}FN_2O.HCl$ requires C,64.05; H,5.1; N,8.9%)

EXAMPLE 22

10-(1-Naphthyl)-2,3,4,10-tetrahydropyrimido[1,2-a)indol-10-ol

Following the method of the previous example 3,4-dihydropryimido[1,2-a]indol-10(2H)-one (2.86g.) in dry tetrahydrofuran(100ml.) was added to 1-naphthylmagnesium bromide (0.05 mole). After work up and removal of the solvent the base was obtained as an oil which was converted to the hydrochloride in the usual way. The product (3.8g.) had m.p. 270°–274°C-(decomp.) (Found: C,71.0, H,5.5; N,7.7. $C_{21}H_{18}N_2O.HCl.1/4H_2O$ requires C,71.25; H,5.5; N,7.9%)

EXAMPLE 23

10-(o-Chlorophenyl)-2,3,4,10-tetrahydropyrimido[1,2-a]indol-10-ol

Following the method of Example 21, 3,4-dihydropyrimido[1,2-a]indol-10[2H]-one (2.8g.) was added to a solution of o-chlorophenylmagnesium bromide (0.05mole.) in dry tetrahydrofuran (100 ml.). After pouring the reaction mixture onto ice and ammonium chloride solution the solid formed was filtered and washed with water and ether. The hydrochloride was obtained in the usual way as colourless rhombs (3.47g.)m.p. 287°–90°C(decomp.). (Found:C,60.1; H,5.8; N,7.7. $C_{17}H_{15}ClN_2O.HCl.½ C_2H_5OH$ requires C,60.35; H,5.9; N,7.7%).

EXAMPLE 24.

10-(m-Trifluoromethylphenyl)-2,3,4,10-tetrahydropyrimido[1,2-a]indol-10-ol.

Following the method of Example 21, 3,4-dihydropyrimido[1,2-a]indol-10[2H]-one (2.7g.) was added to a solution of m-trifluoromethylphenylmagnesium bromide (0.05 mole). After pouring onto ice and ammonium chloride solution, the precipitated base was removed and the organic layer worked up and evaporated to give a further quantity of base. The base was converted to the hydrochloride in the usual way yielding 3.95g. of the title compound as the hydrochloride, m.p. 291°–2°C(decomp.). (Found: C,58.6; H,3,3; N,7.5. $C_{18}H_{15}F_3N_2O.HCl$ requires C,58.6; H,4.4; N,7.6%).

EXAMPLE 25

10-(3,4-Dichlorophenyl)2,3,4,10-tetrahydropyrimido[1,2-a]indol-10-ol.

Following Example 21, 3,4-dihydropyrimido[1,2-a]indol-10[2h]-one (2.7g.) was reacted with 3,4-dichlorphenylmagnesium bromide (0.05 mole). After work up, the organic layer was separated and the aqueous layer extracted with chloroform. The combined organic extracts were treated with 2N hydrochloric acid and the precipitated hydrochloride filtered and dried. Recrystallisation from methanol/ether afforded 3.4g. of colourless needles, m.p. 287°–90°C (decomp). (Found: C,54.9; H,4.1; N,7.5. $C_{17}H_{14}Cl_2N_2O.HCl$ requires C,55.2; H,4.1; N,7.6%).

EXAMPLE 26

10-(p-Fluorophenyl)-2,3,4,10-tetrahydropyrimido[1,2-a]indol-10-ol.

Following the method of Example 21, 3,4-dihydropyrimido[1,2-a]indol-10[2H]-one (2.5g.), was reacted with p-fluorophenylmagnesium bromide (0.05 mole). The hydrochloride was formed in the usual way, yielding 2.4g. of cream coloured needles, m.p. 270°–272°C.(Found: C, 63.9; H,4.9; N, 8.6. $C_{17}H_{15}FN_2O.HCl$ requires C,64.0; H, 5.1; N,8.8%).

EXAMPLE 27

2,3,4,10-Tetrahydro-10-(o-trifluoromethylphenyl)-pyrimido [1,2-a]indol-10-ol.

Following the method of Example 21, 3,4-dihydropyrimido[1,2-a]indol-10[2H]-one (2.79g.) was reacted with o-trifluoromethylphenylmagnesium bromide (0.05 mole). The hydrochloride was obtained as fine needles (3.72 g.), m.p. 255°–7°C(decomp.). (Found: C,58.4; H,4.9; N,7.3. $C_{18}H_{15}F_3N_2O.HCl. ½ C_2H_5OH$ requires C,58.2; H,4.9; N,7.15%).

EXAMPLE 28

10-(2,3-Dichlorophenyl)-2,3,4,10-tetrahydropyrimido[1,2-a]indol-10-ol.

Following the method of Example 21, 3,4-dihydropyrimido[1,2-a]indol-10[2H]-one (1.86g.) was reacted with 2,3-dichlorophenylmagnesium bromide (0.025 mole). After work up, the base was obtained as an oil which afforded 1.93g. of the hydrochloride, m.p. 292°–4°C(decomp.). (Found: C,52.7; H,4.1; N,7.3. $C_{17}H_{14}Cl_2N_2O.HCl.H_2O$ requires C,52.7; H,4.4; N,7.2%).

EXAMPLE 29

3,4-Dihydro-3,3-dimethylpyrimido[1,2-a]indol-10[2H]-one.

3',4'-Dihydrospiro[1,3-dioxolane-3',3'-dimethyl-2,10'(2H,10H)pyrimido(1,2-a)indole](8.5g.) was added portion-wise to concentrated sulphuric acid (100 ml.) keeping the temperature below 30°C, and controlling the rate of addition so that all the ketal had dissolved before the next portion was added. After leaving stirring at room temperature overnight, the mixture was poured onto ice and neutralised with concentrated aqueous ammonia keeping the temperature below 30°C. The red oil was extracted into methylene dichloride, dried over anhydrous magnesium sulphate, evaporated to a red foam which afforded 5.98g. of scarlet rhombs, m.p.125–126°C from benzene-light petroleum (b.p. 40°–60°C). (Found: C,73.3; H,6.7; N,13.0. $C_{13}H_{14}N_2O$ requires C,72.9; H,6.6; N,13.1%).

EXAMPLE 30

10-(m-Chlorophenyl)-2,3,4,10-tetrahydro-3,3-dimethylpyrimido[1,2-a]indol-10-ol.

Following the method of example 21,3,4-dihydropyrimido-3,3-dimethyl[1,2-a]indol-10[2H]-one (2.4g.) was added to a solution of m-chlorophenyl magnesium bromide (0.05 mole). After work up, the base was filtered off and converted to the hydrochloride in the usual way giving 2.0g. of the title compound hydrochloride m.p. 271°–273°C(decomp.). (Found: C,62.8; H,5.5; N,7.6. $C_{19}H_{19}ClN_2O.HCl$ requires C,62.8; H,5.55; N,7.7%)

EXAMPLE 31

2,3,4,10-Tetrahydro-10-phenyl-3,3-dimethylpyrimido[1,2-a]indol-10-ol.

Following the method of Example 21 3,4-dihydro-3,3-dimethylpyrimido[1,2-a]indol-10[2H]-one (3g.), was reacted with phenyl magnesium bromide (0.05 mole). After work up, 2.4g. of the hydrochloride was obtained m.p. 260°–261°C(decomp.). (Found: C,69.0; H,6.75, N,8.3. $C_{19}H_{20}N_2O. HCl$ requires C,69.4; H,6.4; N,8.5%).

EXAMPLE 32

3.4-Dihydro-8-methoxypyrimido[1,2-a]indol-10(2H)-one.

a. 5-Methoxy-2,3-dioxoindoline-1-propionitrile

5-Methoxyisatin (20.28g; M.Akahoshi, J.Pharm. Soc. Japan, 1951, 71, 710–711; Chem. Abstracts, 1952, 46, 2047) and 40% aqueous solution of benzyl trimethylammonium hydroxide (5ml.) was heated to reflux in absolute ethanol (500ml.) and acrylonitrile (19ml., added dropwise. The mixture was heated under reflux for 30 minutes, cooled and the purple crystals filtered off to afford 17.39g. of the title compound. The product was recrystallised from aqueous dimethylformamide for characterisation, m.p. 182°–185°C. (Found: C,62.5; H,4.5; N,12.2. $C_{12}H_{10}N_2O_3$ requires C,62.5; H,4,4; N,12.2%).

b. 2'-Oxospiro [1,3-dioxolane-2,3'-(5-methoxyindoine)]-1'-propionitrile.

Ethane-1,2-diol (12 ml.), 5-methoxy-2,3-dioxoindoline-1-propionitrile (16.4g.), benzene (500ml.) and toluene-p-sulphonic acid (0.5g.) were heated together under reflux in an apparatus fitted with a water separator. After 12 hours, the theoretical quantity of water had separated. The mixture was washed with water then sodium bicarbonate solution and the organic phase dried over anhydrous magnesium sulphate. After removal of the solvent and recrystallisation from propan-2-ol 13.6g. of the product was obtained, m.p. 110°–111°C. (Found: C,61.5; H,5.2; N,10.3. $C_{14}H_{14}N_2O_4$ requires C,61.2; H,5.1; 10.2%).

c. 3',4'-Dihydrospiro[1,3-dioxolane-2,10'(2H,10H)-8'-methoxypyrimido [1,2-a]indole]

The product of part (b) (13g.) was reduced at an initial pressure of 1,100 p.s.i. of hydrogen and a temperature of 40°C in absolute ethanol (400 ml.) half saturated with ammonia in the presence of W7 Raney Nickel (2.0g.) for a period of 4 hours. The reaction mixture was cooled, the catalyst filtered off and the ethanol removed under reduced pressure. The product was dissolved in toluene and heated under reflux with phosphorus oxychloride (10 drops) for 12 hours. The insoluble material was filtered off and the toluene removed under reduced pressure to leave an oil which spontaneously crystallised. The oil was converted to the hydrochloride and recrystallised from propan-2-ol affording 5.65g. of product which decomposed at 300°–360°C. (Found: C,56.53; H,5.7; N,9.15. $C_{14}H_{16}N_2O_3. HCl$ requires C,56.65; H,5.8; N,9.4%).

d. The product of part (c) (4.6g.) was added the stirring to concentrated sulphuric acid (50ml.) keeping the temperature below 20°C. The mixture was stirred for 30 minutes then poured onto ice. After neutralisation with ammonia, the purple product was extracted into chloroform, dried over magnesium sulphate and, after removal of the solvent, recrystallised from benzene affording 2.7g. of purple rhombs, m.p. 150°–151°C. (Found: C,66.9; H,5.7; N,12.7. $C_{12}H_{12}N_2O_2$ requires C,66.7; H,5.6; N,13.0%)

EXAMPLE 33

10-(m-Chlorophenyl)-8-methoxy-2,3,4,10-tetrahydropyrimido[1,2-a]indol-10-ol.

Following the method of example 21, 3,4-dihydro-8- methoxypyrimido[1,2-a]indol-10(2H,-one, (1.45g.), was reacted with m-chlorophenylmagnesium bromide (0.025mole). Work up afforded 1.36g. of the hydrochloride, m.p. 282°–283°C. (decomp.). (Found: C,59.2; H,5.1; N,7.6 C$_{18}$H$_{17}$ClN$_2$O$_2$.HCl requires C,59.1; H,5.0; N,7.6%).

EXAMPLE 34

2,3,4,10-Tetrahydro-8-methoxy-10-phenylpyrimido[1,2-a]indol-10-ol.

Following the method of Example 21, 3,4-dihydro-8-methoxypyrimido[1,2-a]indol-10(2H)-one (1.45g.) was reacted with phenylmagnesium bromide (0.025mole.). Work up afforded 1.29g. of the hydrochloride, m.p. 285°–8°C. (decomp.). (Found: C,64.1; H,5.8; N,8.4. C$_{18}$H$_{18}$N$_2$O$_2$. HC1 requires C,65.25; H,5.8; N,8.45%).

EXAMPLE 35

2,3,4,10-Tetrahydro-8-nitropyrimido[1,2-a]indol-10(2H)-one

Finely powdered 3′,4′-dihydrospiro[1,3-dioxolane-2,10′(2H,10H)-pyrimido](1,2-a)indole (6.92g.) was added to concentrated sulphuric acid (30ml.). On completion of the addition, the mixture was stirred at room temperature for 2 hours, cooled to −10°C and fuming nitric acid (2ml.) added dropwise. The reaction was allowed to warm to room temperature then stirred for 30 minutes. The mixture was poured onto ice and neutralised with concentrated aqueous ammonia below 30°C. The precipitate was filtered off and extracted with hot benzene. The yellow residue weighed 5.95g. and decomposed without melting between 300°–360°C. (Found: C,57.2; H,4.05; N,18.3. C$_{11}$H$_9$N$_3$O$_3$ requires C,57.1; H,3.9; N,18.2%).

EXAMPLE 36

10-(o-Fluorophenyl)-2,3,4,10-tetrahydropyrimido[1,2-a]indol-10-ol.

3,4-Dihydropyrimido[1,2-a]indol-10(2H)-one (1.86g.) in dry tetrahydrofuran (80ml.) was added to a solution of o-fluorophenyllithium (0.02 mole.) in ether (50ml.) at −60°C. On completion of the addition the colourless reaction mixture was stirred at −60°C for 2 hours then poured onto ice and ammonium chloride solution. When the mixture had warmed to room temperature, the base was filtered off. The hydrochloride was formed in the usual way yielding 2.8g., m.p. 269°–70°C (decomp.). (Found: C,63.6; H,5.0; N,8.6. C$_{17}$H$_{15}$FN$_2$O. HCl requires C,64.05; H,5.1; N,8.6%).

EXAMPLE 37

2,3,4,10-Tetrahydro-10-(2,6-dimethylphenyl)pyrimido]1,2-a]indol-10-ol.

3,4-Dihydropyrimido[1,2-a]indol-10(2H)-one (1.86g), in tetrahydrofuran was added to 2,6-dimethylphenyl magnesium bromide (0.02 mole.) prepared by the "entrainment" method. The reaction mixture was worked up as described in example 1 and the hydrochloride obtained as colourless needles (1.35g.), m.p. 274°–6°C. (decomp.). (Found: C,69.5; H,6.55; N,8.4. C$_{19}$H$_{20}$N$_2$O. HCl requires C,69.0; H,6.4; N,8.5%).

10-Ethynyl-2,3,4,10-(···········rimido[1,2-a]indol-10

3,4-Dihydropyrimido[1,2-a]indol-10-(2H)-one (7.4g.) in tetrahydrofuran was reacted with ethynylmagnesium bromide (0.15 mole.) as described in Example 21. After work up, 5.8g. of the base was obtained, m.p. 224°–6°C (decomp). The hydrochloride had m.p. 210°–215°C(decomp.). (Found: C,62.5; H,5.4; N,11.0. C$_{13}$H$_{12}$N$_2$O. HCl requires C,62.8; H,5.3; N,11.3%).

EXAMPLE 39

10-(m-Chlorophenyl)-2,3,4,10-tetrahydropyrimido[1,2-a]indol-10-ol acetate.

2,3,4,10-Tetrahydro-10-(m-chlorophenyl)pyrimido[1,2-a]indol-10-ol (3g.) was dissolved in acetic anhydride (100 ml.) and left at room temperature for 48 hours. The acetic anhydride was removed under reduced pressure and the residue re-evaporated with toluene (50 ml.). The residue was dissolved in the minimum quantity of ethanol and treated with a solution of hydrogen chloride in dry ether. The product hydrochloride was obtained as colourless rhombs (3.24g.), m.p. 213°–216°C (decomp.). (Found: C,60.4; H,4.8; N,7.3. C$_{19}$H$_{17}$ClN$_2$O$_2$. HCl requires C,60.5; H,4.8; N,7.4%).

EXAMPLE 40

(+)-10-(m-Chlorophenyl-2,3,4,10-tetrahydropyrimido-[1,2-a:indol-10-ol.

2,3,4,10-Tetrahydro-10-(m-chlorophenyl)pyrimido [1,2-a]indol-10-ol (6.6g.) was dissolved in hot absolute ethanol and L(+) (natural) tartaric acid (3.3g.) added. The mixture was heated until solution was complete. Crystallisation afforded a total of 2.23g. of the L(+) tartarate salt. Recrystallisation 3 times and evaporation of the mother liquors afforded a total of 2.1g.[α]D$_{24}$ + 70.9°] (c 1 in methanol), m.p. 118°C (decomp.). (Found: C,55.7; H, 5.0; N,6.2. C$_{17}$H$_{15}$ClN$_2$O. (CHOH.COOH)$_2$ requires C,56.2; H,4.7; N,6.2%)

EXAMPLE 41

(−)-10-m-Chlorophenyl-2,3,4,10-Tetrahydropyrimido[1,2-a]indol-10-ol.

The mother liquors from example 40 consisting the (−)isomer, were evaporated to dryness and converted to the base (3.84g.) The base was dissolved in hot ethanol and treated with D(−) (unnatural) tartaric acid. After working up as in Example 40, 2.0g of the laevo base as the D(−) tartarate salt was obtained. [α]D$_{24}$−71.4° (c 1 in methanol.), m.p. 118°C (decomp.).

EXAMPLE 42

2,3,4,10-Tetrahydro-10-(2-pyridyl)pyrimido[1,2-a]indol-10-ol.

3,4-Dihydropyrimido [1,2-a]indol-10-(2H) -one (4.0g.) in dry tetrahydrofuran (10ml) was added to a solution of 2-pyridyl lithium (0.04 mole) at −40°C. The reaction mixture was allowed to warm up to room temperature over 2 hr. then decomposed by adding to ice and ammonium chloride. The organic layer was separated and the aqueous layer extracted with chloroform. After drying over anhydrous magnesium sulphate the solvent was removed and the base obtained as 2.73g. of a fawn powder. The hydrochloride was formed in the usual way, affording 3.0g m.p. 268°–70°C. (Found: C,56.0; H,5.2; N,12.4. $C_{16}H_{15}N_3O.2HCl.1/4\ H_2O$ requires C,56.1; H,5.0; N,12.3%).

EXAMPLE 43

10-(m-Chlorophenyl)-2,3,4,10-tetrahydro-10-hydroxy 1-methylpyrimido[1,2-a]indolinium iodide.

10-(m-Chlorophenyl)-2,3,4,10-tetrahydropyrimido [1,2-a]indol-10-ol (2.94g.) was dissolved in hot 2-propanol (50ml.) and methyl iodide (2ml.) added. Heated under reflux for 30 minutes. On cooling the indolinium iodide separated, 4.03g. decomposed without melting at 250°–254°C.
(Found: C,49.3; H,4.3; N,6.6. $C_{18}H_{18}ClIN_2O$ requires C,49.1; H,4.1; N,6.3%).

EXAMPLE 44

10-(m-Chlorophenyl)-1,2,3,4,10,10a-hexahydro-1-methylpyrimido[1,2-a]indol-10-ol.

The quaternary salt prepared in the above example (2.5g.) was added portionwise to a stirred suspension of lithium aluminium hydride (1.8g.) in dry tetrahydrofuran (100ml.). The reaction mixture was stirred under reflux for 5 hours, cooled and decomposed by the addition of water (5ml.). The precipitated organic material was filtered, the filtrate dried over anhydrous magnesium sulphate and evaporated to an oil which was crystallised from benzene-light petroleum (b.p. 60°–80°C) affording 941mg. m.p. 135°–137°C. (Found: C,68.2; H,6.8; N,7.8. $C_{18}H_{19}ClN_2O$ requires C,68.7; H,6.1; N,7.8%).

EXAMPLE 45

1,2,3,4,10,10a-Hexahydro-10-phenylpyrimido[1,2-a]indol-10-ol.

1,2,3,4-Tetrahydro-10-phenylpyrimido[1,2-a]indol-10-ol (1.9g.) was added as a slurry in dry tetrahydrofuran to a suspension of lithium aluminium hydride (0.6g.) in dry tetrahydrofuran (20ml.). The reaction mixture was stirred under reflux for 3 hours, cooled and decomposed with water. After separation of the organic material and removal of solvent a yellow oil was obtained which solidified on trituration with ether giving 1.0g., m.p. 147°C. (Found: C,76.25; H,7.0; N,10.4. $C_{17}H_{18}N_2O$ requires C,76.7; H,6.8; N,10.5%).

The fumarate was obtained from 2-propanol, m.p. 157°C. (Found: C,70.3; H,6.2; N,8.4. $[C_{17}H_{18}N_2O]_2.C_4H_4O_4$ requires C,70.35; H,6.2; N,8.6%).

EXAMPLE 46

1,2,3,4,10,10a-Hexahydrospiro[1,3-dioxolane-2,10'-[3',3-dimethyl]pyrimido[1,2-a]indol].

2'-Oxospiro[1,3 dioxolane-2,3'indoline]-1'-[2,2-dimethylpropionitrile](17.5g) was reduced at an initial pressure of 1,500 p.s.i. and 100°C for 5 hours in ethanol (200ml) half saturated with ammonia in the presence of Raney nickel W.7. (8g). The catalyst was removed and the ethanol removed under reduced pressure. The residual oil was crystallised from benzene, affording 12.09 g., m.p. 93°–96°C. (Found: C,69.7; H,7.7; N,10.8. $C_{15}H_{20}N_2O_2$ requires C,69.2; H,7.7; N,10.8%).

EXAMPLE 47

| Capsules | |
|---|---|
| 10-(m-Chlorophenyl)-2,3,4,10-tetrahydropyrimido[1,2-a]indol-10-ol | 50 mg. |
| Lactose | 108 mg. |
| Talc | 2 mg. |

Batches of the active ingredient and lactose are sieved through a 40 mesh (British Standard) screen and mixed together. Water is added until the mix acquires a suitable consistency for granulation and the wet mass is passed through a 16 mesh (British Standard) screen. The talc is sifted through a 40 mesh (British Standard) screen, added to dried granules and mixed. Hard gelatine capsules are then filled with the mixture.

What is claimed is:

1. A compound selected from the group consisted of indole derivatives having the formula:

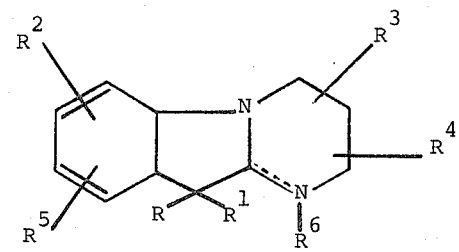

the methiodides thereof and the acid addition salts thereof with pharmaceutically acceptable acids, in which R represents hydroxyl, acetoxy, propionoxy or butyryloxy, $R^1$ represents a member of the group consisting of phenyl, lower alkyl, lower alkynyl, benzyl, naphthyl, thienyl, pyridyl, monohalophenyl, dihalophenyl, lower alkyl phenyl, di(lower alkyl)phenyl, lower alkoxyphenyl, and trifluoromethylphenyl, $R^2$ and $R^5$ (which may be the same or different) represent hydrogen, halogen or lower alkoxy, $R^3$ and $R^4$ (which may be the same or different) represent hydrogen or lower alkyl, the dotted line represents an optional bond in the position indicated, and $R^6$, which is present only when the optional bond represented by the dotted line is absent, represents hydrogen or lower alkyl.

2. An indole derivative according to claim 1 in which the dotted line represents a bond in the position indicated, $R^2$, $R^3$, $R^4$ and $R^5$ represent hydrogen atoms, R represents hydroxyl and $R^1$ represents a member of the group consisting of phenyl, monohalophenyl, dihalophenyl, lower-alkylphenyl, di(lower alkyl) phenyl, lower alkoxyphenyl and trifluoromethylphenyl.

3. An indole derivative according to claim 1 which is 2,3,4,10-tetrahydro-10-phenylpyrimido[1,2-a]indol-10-ol.

4. An indole derivative according to claim 1 which is 10-(m-chlorophenyl)-2,3,4,10-tetrahydropyrimido-[1,2-a]indol-10-ol.

5. An indole derivative according to claim 1 which is 10-(p-chlorophenyl)-2,3,4,10-tetrahydropyrimido[1,2-a]indol-10-ol.

6. An indole derivative according to claim 1 which is 2,3,4,10-tetrahydro-10-(2-thienyl)pyrimido[1,2-a]-indol-10-ol.

7. An indole derivative according to claim 1 which is 10-(m-fluorophenyl)-2,3,4,10-tetrahydropyrimido[1,2-a]indol-10-ol.

8. An indole derivative according to claim 1 which is 10-(3,4-dichlorphenyl)-2,3,4,10-tetrahydropyrimido[1,2-a]indol-10-ol.

9. An indole derivative according to claim 1 which is 10-(m-chlorophenyl)-2,3,4,10-tetrahydro-3,3-dimethylpyrimido[1,2-a]indol-10-ol.

10. An indole derivative according to claim 1 which is 2,3,4,10-tetrahydro-10-phenyl-3,3-dimethylpyrimido[1,2,-a]indol-10-ol.

11. An indole derivative according to claim 1 which is (+)-10-(m-chlorophenyl)-2,3,4,10-tetrahydropyrimido[1,2-a]indol-10-ol.

12. An indole derivative according to claim 1 which is (−)-10-(m-chlorphenyl)-2,3,4,10-tetrahydropyrimido[1,2-a]indol-10-ol.

* * * * *

UNITED STATES PATENT OFFICE
CERTIFICATE OF CORRECTION

PATENT NO. : 3,891,644

DATED : June 24, 1975

INVENTOR(S) : Alan Chapman White

It is certified that error appears in the above-identified patent and that said Letters Patent are hereby corrected as shown below:

In the Title, "1,2,3,4,10A-HEXAHYDROPYRIMIDOL" should read — 1,2,3,4,10, 10A-HEXAHYDROPYRIMIDO —;

In the Assignee, "(Ltd.)," should read -- Limited --.

In the Abstract, line 12, "Hexahydropyrimido" should read — hexahydropyrimido —;

Column 1, line 28, "alkynl" should read — alkynyl —;

Column 1, line 30, "alkly" should read — alkyl —;

Column 2, line 32, "-10" should read — -10-ol —;

Column 2, line 39, "2,3,5,10-" should read — 2,3,4,10- —;

Column 2, line 43, "3,3dimethylpyrimido" should read — 3,3-dimethylpyrimido —;

Column 4, line 40, "$R^6$" should read — $R^{6'}$ —;

Column 6, line 63, "Lift" should read — Life —;

Column 9, line 46, "indole" should read — indole] —;

UNITED STATES PATENT OFFICE
CERTIFICATE OF CORRECTION

PATENT NO. : 3,891,644

DATED : June 24, 1975

INVENTOR(S) : Alan Chapman White

It is certified that error appears in the above-identified patent and that said Letters Patent are hereby corrected as shown below:

Column 9, line 49, "2228," should read — 2228) —;

Column 9, line 53, "or" should read — for —;

Column 10, line 34, "the" should read — to —;

Column 12, line 9, "$C_{12}H_{14}H_2O$" should read — $C_{12}H_{14}N_2O$ —;

Column 13, line 44, "ride" should read — ric —;

Column 14, line 10, "Example 6,8-Chloro-" should read — Example 6, 8-Chloro- —;

Column 14, line 59, "re + ux" should read — reflux —;

Column 15, line 59, "c,64.0;" should read — C,64.0; —;

Column 16, line 47, "10[2h]-one" should read — 10[2H]-one —;

Column 18, line 13, "(19 ml.," should read — (19 ml.) —;

Column 18, line 22, "methoxyindoine)]-1'-propionitrile should read — methoxyindoline)]-1'-propionitrile —;

Column 18, line 53, "added the stir-" should read — added with stir- —;

Column 19, line 1, "(2H," should read — (2H) —;

UNITED STATES PATENT OFFICE
CERTIFICATE OF CORRECTION

PATENT NO. : 3,891,644

DATED : June 24, 1975

INVENTOR(S) : Alan Chapman White

It is certified that error appears in the above-identified patent and that said Letters Patent are hereby corrected as shown below:

Column 20, the first three lines should read

— Example 38

10-Ethynyl-2,3,4,10-tetrahydropyrimido[1,2-a]indol-10-ol —;

Column 20, line 33, "[1,2-a:" should read — [1,2-a] —;

Column 20, line 39, "tartarate" should read — tartrate —;

Column 20, line 53, "tartarate" should read — tartrate —;

Column 21, line 34, "$C_{18}H_{19}Cln_2O$ should read -- $C_{18}H_{19}ClN_2O$ --.

Claim 1, line 1, "consisted" should read — consisting —;

Claim 1, line 3

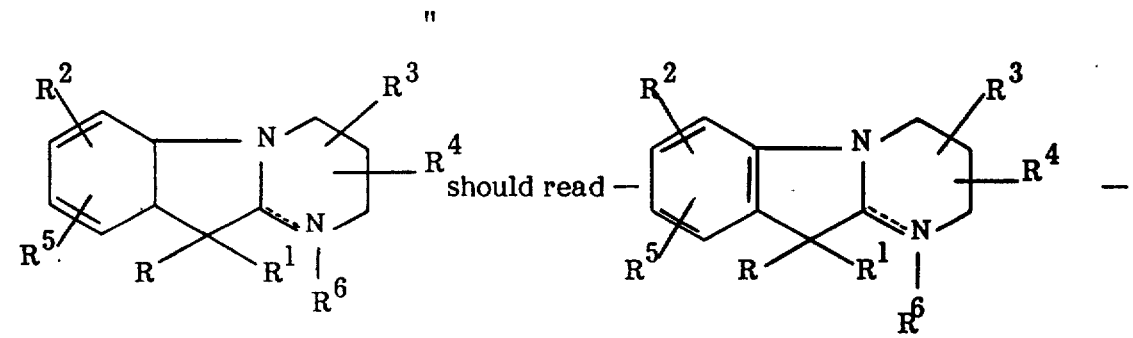

UNITED STATES PATENT OFFICE
CERTIFICATE OF CORRECTION

PATENT NO. : 3,891,644
DATED : June 24, 1975
INVENTOR(S) : Alan Chapman White

It is certified that error appears in the above-identified patent and that said Letters Patent are hereby corrected as shown below:

and
Claim 10, line 2, "(3,4-dichlorphenyl)" should read — (3,4-dichlorophenyl) —;

Claim 12, line 2, "(m-chlorphenyl)" should read — (m-chlorophenyl) —.

*Signed and Sealed this*

*Twenty-ninth* Day of *May 1979*

[SEAL]

Attest:

RUTH C. MASON
*Attesting Officer*

DONALD W. BANNER
*Commissioner of Patents and Trademarks*